Patented June 6, 1950

2,510,487

UNITED STATES PATENT OFFICE 2,510,487

COMPOSITION FOR THE CONTROL OF COCCIDIOSIS

Emanuel Waletzky, Stamford, Conn., assignor to American Cyanamid Company, New York, N. Y., a corporation of Maine No Drawing. Application December 31, 1948, Serial No. 68,759

3 Claims. (Cl. 167—53.1)

This invention deals with measures for the mitigation and control of coccidiosis and more particularly with means for the administration of these measures.

Coccidiosis is a protozoan disease that affects the intestinal tract. The disease is prevalent in poultry, sheep and calves and has its greatest effect on immature birds and mammals. It has been estimated that 12 to 20% of all chicks hatched in the United States die from cecal coccidiosis before they reach the age of one month. While not as lethal to mammals, weight loss and downgrading of the mammalian livestock, due to coccidial infection and consequent debilitation, amounts to economic losses measured in the millions of dollars annually.

It has been discovered that bis-(3-nitrophenyl)-disulfoxide possesses a specific anticoccidial effect. This compound administered preferably by way of a medicated feed to the extent of 20 to 200 milligrams per kilo of animal weight per day, the precise dosage depending on the severity of the infection, prevents losses from coccidiosis if administration is started within 3 days of the ingestion of the infective oocysts. This compound, when administered at the requisite concentration, shows little or no toxic effects. The nutrition, rate of growth and general wellbeing is not disturbed.

Concentration of this compound within the above range of administration while halting the severe ravages and often fatal consequences of the disease, permits mild infections, which enable the host to develop an active immunity against the infection. This immunity protects the animal or fowl after the discontinuation of the medicated feed, even on heavily contaminated premises.

Test animals, which have ingested oocysts in amounts which killed more than 90% of the controls, recover and flourish if this compound is administered up to 72 hours after infection. When the treatment has been delayed, administration should be in the range of the higher concentrations and should continue at these concentrations for at least two days. However, this compound can be most effectively administered as prophylactic long-term continuous treatment at low concentrations in the feed.

The compound of this invention was evaluated by comparing it with sulfaguanidine, which, to date has been one of the most effective and safest medications for the control of coccidiosis. The results show that it is 8 times as effective as sulfaguanidine and is completely safe for routine treatment, since it possesses sufficient margin between therapeutic dosage and dosages which affect only slightly the rate of gain in weight of healthy animals.

The compound was administered to chicks in various concentrations in their mash and the sulfaguanidine ratio was established by determining the minimum amount of the test compound which affords the same protection to the test animals as does the established dosage of sulfaguanidine. A sulfaguanidine ratio of 8 indicates that .12 gm. of the test compound affords the same protection to the animal as would 1.00 gm. of sulfaguanidine. The sulfaguanidine ratio of bis-(3-nitrophenyl)-disulfoxide is 8.

Although the birds or animals may be given direct individual doses of this compound by oral administration one or more times a day, the preferred method of treatment is to allow the animal to feed "ad libitum" on its normal diet in which the compound of the invention is mixed. Such medicated feeds should contain enough of the drug so that the dosage range indicated above will be ingested by the animals in their normal daily diet.

The preferred manner of supplying the compound of the present invention for administration is to thoroughly mix it in the animal's feed in the concentration ranges indicated below. The higher concentration ranges may be mixed with all or selected portions of the animal's daily rations, the concentration being so regulated that the animal will ingest daily 20 to 200, mgms. of the drug per kilogram of body weight.

In the case of chickens or other fowl such a medicated feed should contain from about .01 to 0.10% by weight of this compound in the food when the treatment is of a long-term nature, to protect the birds from the deleterious consequences of acute infection over long periods of time. Of course, if an infection has already been established, the concentrations of the compound may safely range as high as 0.2% by weight of the daily total food intake. This compound may also be supplied to the fowl by being dissolved or suspended in the drinking water or other liquid constituent of the diet such as skim milk, buttermilk, or the like.

What I claim:

1. A medicated poultry and animal feed effective in the control of coccidiosis comprising bis-(3-nitrophenyl)-disulfoxide and the normal animal ration.

2. A medicated poultry and animal feed effective in the control of coccidiosis comprising bis- (3-nitrophenyl)-disulfoxide in the concentration of at least 0.010% by weight and the normal animal ration.

3. A poultry and animal feed effective in the control of coccidiosis comprising 0.01% to 0.2% by weight of bis-(3-nitrophenyl)-disulfoxide and grain mash.

EMANUEL WALETZKY.

REFERENCES CITED

The following references are of record in the file of this patent:

UNITED STATES PATENTS

| Number | Name | Date |
|---|---|---|
| 2,279,421 | Tisdale | Apr. 14, 1942 |

OTHER REFERENCES

Ekbom, Berichte der Deutschen Chemischen Gesellschaft, vol. 24, page 335. (Copy in Scientific Library.)